(12) United States Patent
Geva et al.

(10) Patent No.: US 8,557,079 B2
(45) Date of Patent: Oct. 15, 2013

(54) METHOD OF MAKING A MULTILAYERED POLYETHYLENE MATERIAL

(75) Inventors: Shalom Geva, Holon (IL); Yuval Fuchs, Netanya (IL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/235,029

(22) Filed: Sep. 16, 2011

(65) Prior Publication Data

US 2012/0006474 A1 Jan. 12, 2012

Related U.S. Application Data

(62) Division of application No. 12/043,038, filed on Mar. 5, 2008, now Pat. No. 8,128,778, which is a division of application No. 11/204,847, filed on Aug. 15, 2005, now Pat. No. 7,993,715.

(60) Provisional application No. 60/601,645, filed on Aug. 16, 2004, provisional application No. 60/626,206, filed on Nov. 8, 2004.

(51) Int. Cl.
*F41H 1/02* (2006.01)

(52) U.S. Cl.
USPC ......... 156/267; 156/299; 156/300; 156/308.2

(58) Field of Classification Search
None
See application file for complete search history.

(56) References Cited

U.S. PATENT DOCUMENTS

| | | |
|---|---|---|
| 3,903,557 A | 9/1975 | Howland, Jr. |
| 4,309,487 A | 1/1982 | Holmes |
| 4,574,105 A | 3/1986 | Donovan |
| 4,820,568 A | 4/1989 | Harpell et al. |
| 4,879,076 A | 11/1989 | Sano et al. |
| 4,931,126 A | 6/1990 | McCarville et al. |
| 4,944,974 A | 7/1990 | Zachariades |
| 5,091,133 A | 2/1992 | Kobayashi et al. |
| 5,106,555 A | 4/1992 | Kobayashi et al. |
| 5,106,558 A | 4/1992 | Kobayashi et al. |
| 5,200,129 A | 4/1993 | Kobayashi et al. |
| 5,340,633 A | 8/1994 | van der Loo et al. |
| 5,437,905 A | 8/1995 | Park |
| 5,552,208 A | 9/1996 | Lin et al. |
| 5,578,373 A | 11/1996 | Kobayashi et al. |
| 5,580,629 A | 12/1996 | Dischler |
| 5,587,230 A | 12/1996 | Lin et al. |

(Continued)

FOREIGN PATENT DOCUMENTS

| | | |
|---|---|---|
| EP | 0 786 507 | 4/1997 |
| EP | 1 908 586 | 4/2008 |

(Continued)

OTHER PUBLICATIONS

Hine, P.J. et al, "A Comparison of the Hot-Compaction Behavior of Oriented, High-Modulus, Polyethylene Fibers and Tapes," J. Macromol. Sci. Physics, 2001, pp. 959-989, vol. B40(5).

(Continued)

*Primary Examiner* — Barbara J Musser
(74) *Attorney, Agent, or Firm* — Nixon & Vanderhye P.C.

(57) ABSTRACT

The present invention relates to polyethylene material that has a plurality of unidirectionally oriented polyethylene monolayers cross-piled and compressed at an angle to one another, each polyethylene monolayer composed of ultra high molecular weight polyethylene and essentially devoid of resins. The present invention further relates to ballistic resistant articles that include or incorporate the inventive polyethylene material and to methods of preparing the material and articles incorporating same.

5 Claims, 4 Drawing Sheets

(56) References Cited

U.S. PATENT DOCUMENTS

| | | |
|---|---|---|
| 5,589,254 A | 12/1996 | Dischler |
| 5,628,946 A | 5/1997 | Ward et al. |
| 5,935,678 A | 8/1999 | Park |
| 6,183,834 B1 | 2/2001 | van der Loo |
| 2003/0200861 A1 | 10/2003 | Cordova et al. |
| 2003/0221390 A1 | 12/2003 | Docter |
| 2004/0180195 A1 | 9/2004 | Macuga |

FOREIGN PATENT DOCUMENTS

| | | |
|---|---|---|
| WO | 2005/065910 | 7/2005 |
| WO | 2007/054079 | 5/2007 |
| WO | 2007/122009 | 11/2007 |
| WO | 2007/122010 | 11/2007 |
| WO | 2007/122011 | 11/2007 |
| WO | 2008/040506 | 4/2008 |
| WO | 2008/077605 | 7/2008 |
| WO | 2008/077606 | 7/2008 |
| WO | 2008/148550 | 12/2008 |

OTHER PUBLICATIONS

Jordan, N.D. et al, "The Development of Morphology during Hot Compaction of Tensylon High-Modulus Polyethylene Tapes and Woven Cloths," Polymer, 2002, pp. 3397-3404, vol. 43.

Hearle J.W.S., "High-Performance Fibres," Woodhead Pub. Limited in association with the Textile Institute, 2001, pp. 132-144.

METHOD OF MAKING A MULTILAYERED POLYETHYLENE MATERIAL

This application is a divisional of U.S. application Ser. No. 12/043,038, filed Mar. 5, 2008, now U.S. Pat. No. 8,128,778, which is a divisional of U.S. application Ser. No. 11/204,847, filed Aug. 15, 2005 (now U.S. Pat. No. 7,993,715) which in turn claims priority benefits from U.S. Provisional Application Ser. Nos. 60/601,645 filed Aug. 16, 2004 and 60/626,206 filed Nov. 8, 2004, the entire content of each being expressly incorporated hereinto by reference.

FIELD OF INVENTION

The present invention relates to a novel polyethylene material comprising a plurality of unidirectionally oriented polyethylene monolayers cross-plied and compressed at an angle to one another, each polyethylene monolayer formed of ultra high molecular weight polyethylene and essentially devoid of resins. The present invention further relates to ballistic resistant articles comprising the polyethylene material and methods of preparing same.

BACKGROUND OF THE INVENTION

Ultra high molecular weight (UHMW) polyethylene is an ethylene polymer with an extremely high molecular weight of one million or greater characterized by high resistance to impact.

Ballistic resistant polymer monolayers, including inter alfa polyethylene monolayers, are typically formed from fibers, a solution or a powder of the polymer. Polymer fibers are woven, knitted or not woven and monolayers composed from these fibers typically comprise an elastic resin or a polymeric matrix that encapsulate and holds the fibers together (see for example, U.S. Pat. Nos. 4,574,105; 4,820,568 and 4,944,974 among others).

The prior art teaches that the percentage of resin, bonding materials and the like must not exceed 20% of the total weight of a ballistic resistant material, otherwise the anti-ballistic qualities of the material begin to deteriorate. For example, European Patent No. 768,507 to van de Goot et al. discloses a ballistic-resistant article containing a compressed stack of monolayers containing unidirectionally oriented reinforcing aramid fibers and a matrix consisting of a polymer, the content of which is at most 25 weight percentage, the fiber direction in each monolayer being rotated with respect to the fiber direction in an adjacent monolayer. Ballistic resistant articles comprising successive layer of fibers in a matrix composition, the matrix composition is about 20 weight percentage of the total weight are disclosed in U.S. Pat. Nos. 5,552,208 and 5,587,230 among others.

U.S. Pat. No. 5,340,633 to van der Loo discloses a multilayered antiballistic structure comprising a first layer which comprises ceramic tiles, a second layer of composite material comprising polyalkene filaments, a matrix that surrounds the polyalkene filaments and an intermediate layer of a material between the first and the second layers, having a flexural modulus which is higher than that of the material of the second layer and lower than that of the ceramic material.

A ballistic resistant article constructed of high performance fibers and devoid of resins is disclosed in U.S. Pat. No. 5,935,678 to Park, The article includes two arrays of high performance, unidirectionally-oriented fiber bundles, cross-plied at an angle with respect to one another in the absence of adhesives or bonding agents. Thermoplastic films, including inter alia polyethylene films, are bonded to the outer surfaces of the arrays without penetration of the films into the fiber bundles. This arrangement substantially reduces the weight of the resulting article without compromising the anti-ballistic characteristics thereof.

Formation of UHMW polyethylene tapes and films from a powder of polyethylene rather than from polyethylene fibers is known in the art. U.S. Pat. No. 4,879,076 to Kobayashi et al. discloses a process for producing a polyethylene material of great mechanical strength and high elastic modulus from particulate UHMW polyethylene, wherein the particulate UHMW polyethylene is obtained from polymerization of ethylene at a temperature between 20° C. to 110° C. in the presence of a catalyst comprising magnesium, vanadium and an organometallic compound.

U.S. Pat. No. 5,091,133 to Kobayashi et al. discloses an improvement to the process disclosed in the U.S. Pat. No. 4,879,076. The process is directed to continuous production of a high-strength and high modulus polyolefin material, comprising feeding a polyolefin powder between a combination of endless belts, compressing-molding the polyolefin powder in a temperature below the melting point thereof and rolling the resultant compression-molded polyolefin followed by stretching.

U.S. Pat. No. 5,106,555 to Kobayashi et al. discloses another improvement to the processes disclosed in the U.S. Pat. Nos. 4,879,076 and 5,091,133, the improvement including: (i) using an UHMW polyethylene powder that has an intrinsic viscosity of 5-50 dl/g as measured at 135° C. in decalin as a principal component in the process and (ii) concurrently processing, in at least one of the compression-molding step and rolling step, an olefin polymer having an intrinsic viscosity from 0.5-3 dl/g.

Another improvement to the processes for continuous production of a high-strength and high modulus polyolefin material is disclosed in U.S. Pat. No. 5,106,558 to Kobayashi et al. The process comprises, prior to feeding and compressing-molding the polyethylene powder, the step of mixing an UHMW polyethylene powder with a liquid organic compound having a boiling point higher than the melting point of said polyethylene.

U.S. Pat. No. 5,200,129 to Kobayashi et al. discloses an alternative process for continuously producing a high-strength and high-modulus polyolefin material. The process comprises using, at the compression-molding step, particular pressing means comprising two opposing sets of a plurality of rollers, the rollers in each set are not connected together as disclosed in the U.S. Pat. No. 5,091,133, rather each roller is rotatably supported at the shaft ends by a frame.

A split polyethylene stretched tape produced by subjecting UHMW polyethylene to compression-molding, rolling, stretching and then to splitting is disclosed in U.S. Pat. No. 5,578,373 to Kobayashi et al. The split polyethylene has a tensile strength of 0.7 to 5 GPa when twisted in the range of 50-500 times/m.

Despite the foregoing materials and processes, there still remains a need for polymeric materials having enhanced properties for use in antiballistic articles, and these are now provided by the present invention.

SUMMARY OF THE INVENTION

The present invention relates to a multilayered polyethylene material essentially devoid of resins, adhesives and bonding agents, the material comprising a plurality of unidirectionally oriented polyethylene monolayers cross-plied at an angle with respect to one another. According to certain embodiments each unidirectional polyethylene monolayer comprises at least two unidirectional polyethylene strips, the polyethylene strips formed by compression-molding and stretching a solid form of ultra high molecular weight polyethylene, substantially devoid of resins or adhesives.

The known art does not disclose or teach a material comprising unidirectional monolayers consisting essentially of ultra high molecular weight polyethylene and essentially devoid of resins, where the monolayers are cross-plied and compressed at an angle to one another. The inventors have found that this material exhibits antiballistic properties, improved tenacity, exceptional rigidity and capability of maintaining its form when exposed to ballistic impact, thus rendering it eminently suitable for use in antiballistic or ballistic resistant articles. The invention also relates to an article comprising the material described herein in combination with an additional material selected from the group consisting of: ceramic, steel, aluminum, titanium, glass and graphite. Advantageously, the article is an antiballistic or a ballistic resistant article in the form or a fabric envelope or supporting structure, preferably one that can be worn, i.e., a garment.

This invention further relates to methods of preparing unidirectional monolayers of the type mentioned herein as well as to the preparation of bilayered materials that incorporate or include the unidirectional monolayers therein. Methods of making antiballistic or ballistic resistant articles that include the steps of these methods are also provided.

Other features and advantages of the present invention will become clear from the following description and drawings.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

Figure 1:
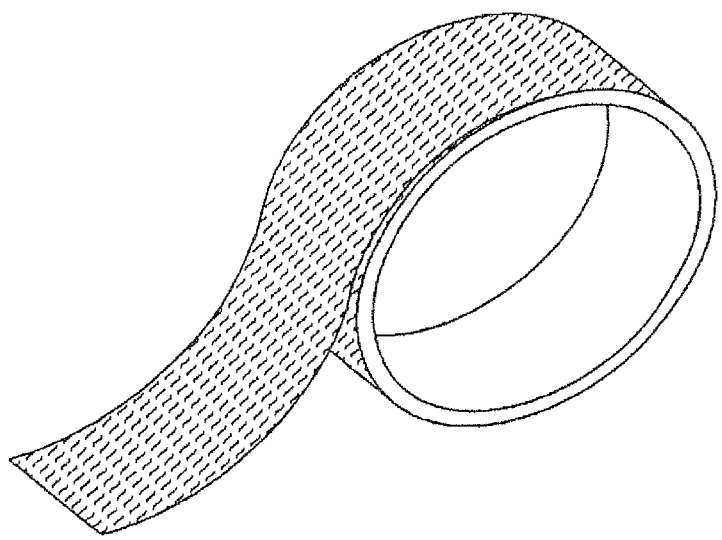
FIG. 1 demonstrates a role of a polyethylene strip.

The present invention provides a ballistic resistant article polyethylene consisting essentially of ultrahigh molecular weight polyethylene, the article comprising a plurality of unidirectionally oriented polyethylene monolayers cross-plied, positioned and arranged at an angle with respect to one another and attached to each other in the absence of any resin, bonding matrices and the like.

The ultra high molecular weight polyethylene material of the invention is exceptionally rigid, highly impenetrable and particularly light. For example, a bilayered material consisting of two monolayers will have a typical a real density of about 125 g/m² and an average thickness of 100 to 160 μm though it is to be understood explicitly that these values are merely representative values.

The present invention further provides a ballistic resistant article devoid of resins, adhesives and bonding agents, the article comprising a plurality of layers of ultrahigh molecular weight polyethylene material according to the principles of the invention and having any desired thickness, shape or contour.

The present invention is based in part on the unexpected discovery that a polyethylene article, consisting essentially of ultra high molecular weight polyethylene and essentially devoid of resins and other bonding materials, exhibits improved antiballistic and tenacity properties, exceptional rigidity at an outstanding low weight per area as compared to ballistic resistance materials known in the art.

The polyethylene material and article of the present invention are particularly advantageous over previously known antiballistic materials as they provide the following features:

1. Low weight—the ballistic resistant material of the present invention afford the manufacturing of ballistic resistant molded articles that provide at least the same level of protection as the known molded articles at a significantly lower weight. Low weight per unit area is of great importance in many applications. This is the case, for instance, in the field of personal protective equipment such as helmets, shields, shoes and the like. Low weight is also essential for the application of ballistic-resistant molded articles in for instance helicopters, motorcars and high-speed, highly maneuverable combat vehicles;

2. Economical—the starting material (essentially UHMW polyethylene) is inexpensive and the manufacturing process is relatively short and thus cost effective, as compared with antiballistic materials and processes of making same as are known in the art;

3. Improved heat stability—due to the absence of resins and other bonding materials the material of the invention is stable at high temperatures, particularly at the temperatures resulting from a ballistic impact or the operating temperatures typically associated with a variety of engines such as internal combustion engines. Additionally, the material of the invention and articles consisting therefrom have exceptionally long shelf-life due to their heat stability;

4. Deformation resistance—due to the absence of resins and other bonding materials and due to the low elasticity of the UHMW polyethylene monolayers the article maintains its structure even under an extreme impact, such as a ballistic impact; and 5. Can be easily laminated to other materials—ballistic resistant articles with large surface areas and any desired shape and curvature can be readily produced from the polyethylene material of the invention. Such articles may be applied as a protective cover to other materials and articles.

According to one aspect, the present invention provides a material comprising a plurality of unidirectional monolayers consisting essentially of UHMW polyethylene and essentially devoid of bonding matrices, with the direction of each monolayer being rotated at an angle with respect to the direction in an adjacent unidirectional monolayer.

According to one embodiment, the material comprising two monolayers compressed at an angle to one another.

According to certain embodiments, the direction of each unidirectional monolayer is rotated or positioned with respect to the direction in an adjacent unidirectional monolayer at an angle of 20 to 160 degrees. According to other embodiments, the angle is 70 to 110 degrees. According to yet other embodiments, the angle is substantially 90 degrees. Of course, the term "angle" does not include angles of 0, 180 or multiples of 180 as those arrangements would have the directions of the monolayers in parallel alignment.

According to yet another embodiment, the material comprises a plurality of unidirectional monolayers wherein each monolayer has a tensile strength of 8-40 cN/dTex, preferably 10 to 35 cN/dTex. One cN/dTex (or cN/dtex) is equivalent to one centi-Newton per one deciTex (i.e., $10^{-1}$ of a Tex) wherein a Tex is defined as $1 \cdot 10^{-6}$ kg/m.

According to yet another embodiment, the material comprises a plurality of unidirectional monolayers wherein each unidirectionally oriented monolayer is 30-120 μm thick. According to yet another embodiment, each unidirectionally oriented monolayer is 50-100 μm thick.

According to yet another embodiment, the material comprises a plurality of unidirectional monolayers wherein the areal density of each unidirectionally oriented monolayer is within the range of 60 to 200 g/m².

According to yet another embodiment, the material comprises a plurality of unidirectional monolayers wherein each unidirectionally oriented monolayer has an elastic modulus of 400 to 1,200 cN/dTex. According to yet another embodiment, each unidirectionally oriented monolayer has an elongation modulus of 2-6%. According to yet another embodiment, each unidirectionally oriented monolayer has a maximal displacement of 2-12 mm per 200 mm.

According to yet another embodiment, the material comprising a plurality of unidirectional monolayers wherein each unidirectionally oriented monolayer consists essentially of ultra high molecular weight polyethylene.

According to various embodiments, the material is used in combination with an additional material selected from the group consisting of: ceramic, steel, aluminum, titanium, glass and graphite.

According to yet another embodiment, the material is a ballistic resistant article. In some embodiments, the ballistic resistant article comprises between 70 to 280 monolayers.

According to yet another embodiment, the ballistic resistant article is contained within a fabric envelope. According to yet another embodiments, the ballistic resistant article is contained within a supporting structure for being worn on a body part. According to yet another embodiment, the ballistic resistant polyethylene article is contained within a body garment.

According to yet another aspect, the present invention provides a method for the continuous preparation of a unidirectional monolayer consisting essentially of ultrahigh-molecular-weight polyethylene, comprising:
(a) providing a plurality of unidirectional ultrahigh-molecular-weight polyethylene strips;
(b) aligning the plurality of unidirectional ultrahigh-molecular-weight polyethylene strips in the same direction, wherein adjacent strips partially overlap; and
(c) compressing said plurality of unidirectional ultrahigh-molecular-weight polyethylene strips thereby obtaining a unidirectional ultrahigh-molecular-weight polyethylene monolayer.

According to one embodiment, compressing the plurality of unidirectional ultrahigh-molecular-weight polyethylene strips according to the method of this aspect occurs at a temperature below the melting point of the ultrahigh-molecular-weight polyethylene. According to anther embodiment, compression temperature is within the range of 110 to 150° C.

According to another embodiment, compressing said plurality of unidirectional ultrahigh-molecular-weight polyethylene strips occurs at a temperature below the melting point of the ultrahigh-molecular-weight polyethylene and under a pressure of 10 to 100 N/cm².

According to yet another embodiment, the unidirectional ultrahigh-molecular-weight polyethylene monolayer obtained by the method of this aspect is essentially devoid of bonding matrices.

According to yet another embodiment, the unidirectional ultrahigh-molecular-weight polyethylene monolayer obtained by the method of this aspect is 30-120 μm thick, alternatively 50-100 μm thick. According to yet another embodiment, the areal density of the unidirectional ultrahigh-molecular-weight polyethylene monolayer is within the range of 60-200 g/m².

According to yet another embodiment, the unidirectional ultrahigh-molecular-weight polyethylene monolayer obtained by the method of this aspect has a tensile strength of 10 to 25 cN/dTex. According to yet another embodiment, the unidirectional ultrahigh-molecular-weight polyethylene monolayer has an elastic modulus of 400 to 1,200 cN/dTex. According to yet another embodiment, the unidirectional ultrahigh-molecular-weight polyethylene monolayer has an elongation modulus of 2-6%. According to yet another embodiment, the unidirectional ultrahigh-molecular-weight polyethylene monolayer has a maximal displacement of 2-12 mm per 200 mm.

According to an alternative embodiment, the method for the continuous preparation of unidirectional monolayers further comprising after step (b) and before step (c) the step of:
laying a polymeric film having a melting point substantially lower than the melting point of the polyethylene strips over each area of contact between two adjacent unidirectional ultrahigh-molecular-weight polyethylene strips, the polymeric film is laid in parallel to the direction of the aligned plurality of unidirectional ultrahigh-molecular-weight polyethylene strips.

According to one embodiment, the polymeric film is selected from the group consisting of: low density polyethylene, high density polyethylene, polyamide, polypropylene, polyester, polystyrene, polyethylene, polycarbonate and poly(methyl methacrylate). According to one embodiment, the polymeric film is 4 to 25 μm thick.

According to yet another aspect, the present invention provides a method for the continuous preparation of a material comprising a plurality of unidirectional monolayers consisting essentially of ultrahigh-molecular-weight polyethylene and essentially devoid of bonding matrices, wherein the direction of each monolayer being rotated with respect to the direction of an adjacent unidirectional monolayer, the method comprising:
(a) providing a first unidirectional ultrahigh-molecular-weight polyethylene monolayer;
(b) providing a plurality of unidirectional ultrahigh-molecular-weight polyethylene strips;
(c) aligning the plurality of unidirectional ultrahigh-molecular-weight polyethylene strips such that each strip is oriented in parallel to adjacent strips, wherein adjacent strips partially overlap, said plurality of strips is laid over the first unidirectional ultrahigh-molecular-weight polyethylene monolayer, wherein the direction of said plurality of strips being rotated with respect to the direction of said first unidirectional ultrahigh-molecular-weight polyethylene monolayer at an angle; and
(d) compressing said plurality of unidirectional ultrahigh-molecular-weight polyethylene strips laid over said unidirectional ultrahigh-molecular-weight polyethylene monolayer, thereby obtaining a bilayered material consisting essentially of ultrahigh-molecular-weight polyethylene and essentially devoid of bonding matrices, comprising two compressed unidirectional monolayers with the direction of each monolayer being rotated at an angle with respect to the direction in an adjacent unidirectional monolayer.

According to certain embodiments, the direction of said plurality of strips provided in the method of this aspect, is rotated at an angle of 20 to 160 degrees with respect to the direction of the first unidirectional ultrahigh-molecular-weight polyethylene monolayer. According to other embodiments, the angle is 70 to 110 degrees. According to yet other embodiments, the angle is substantially 90 degrees.

According to an alternative embodiment, the method for the continuous preparation of a material comprising a plurality of unidirectional monolayers further comprises after step (c) and before step (d) the step of laying a polymeric film having a melting point substantially lower than the melting point of the polyethylene strips over each area of contact between two adjacent unidirectional ultrahigh-molecular-weight polyethylene strips, the polymeric film being laid in parallel to the direction of the aligned plurality of unidirectional ultrahigh-molecular-weight polyethylene strips.

According to one embodiment, the polymeric film is 4 to 25 μm thick. According to another embodiment, the polymeric film is selected from the group consisting of: low density polyethylene, high density polyethylene, polyamide, polypropylene, polyester, polystyrene, polyethylene, polycarbonate and poly(methyl methacrylate).

According to another embodiment, step (d) of the method for the continuous preparation of a material comprising a plurality of unidirectional monolayers occurs at a temperature below the melting point of the ultrahigh-molecular-weight polyethylene. According to yet another embodiment, step (d) occurs at a temperature between 100° C. to 150° C. According to yet another embodiment, step (d) occurs at a temperature below the melting point of the ultrahigh-molecular-weight polyethylene and under a pressure of 10 to 100 N/cm$^2$.

According to one embodiment, the bilayered material obtained by the method of this aspect has a tensile strength within the range of 8 to 40 cN/dTex. The tensile strength is obtained irrespective of the direction of the strips in each monolayer. According to yet another embodiment, the bilayered material is about 60-500 μm thick. According to yet another embodiment, the bilayered material has an areal density of 100-500 g/m$^2$. According to yet another embodiment, the bilayered material has an elastic modulus of 400 to 1,200 cN/dTex at any direction. According to yet another embodiment, the bilayered material has an elongation modulus of 2-6% at any direction.

According to yet another embodiment, the method of this aspect further comprises:
(e) repeating steps (a) to (d) at least once, thereby obtaining a plurality of bilayered materials; and
(f) compressing-molding at least two bilayered materials obtained in step (e) thereby obtaining a multilayered material.

According to an alternative embodiment, step (e) is repeated until the desired number of bilayered materials is obtained. According to yet another embodiment, step (f) is conducted at a temperature below the melting point of the ultrahigh molecular weight polyethylene. According to yet another embodiment, step (f) is conducted at a temperature between 90 and 150° C. and, optionally, under a pressure of 100 to 200 bar.

According to yet another embodiment, the multilayered material obtained by the method of this aspect is a ballistic resistant article.

According to yet another embodiment, the method of this aspect further comprises the step of: cutting the multilayered material to a desired shape.

According to yet another embodiment, the first unidirectionally oriented monolayer provided in step (a) of the method of this aspect has a tensile strength within the range of 10 to 25 cN/dTex. According to yet another embodiment, the first unidirectionally oriented monolayer provided in step (a) is about 30-120 μm thick. According to yet another embodiment, the first unidirectionally oriented monolayer provided in step (a) has an areal density of 60-200 g/m$^2$. According to yet another embodiment, the first unidirectionally oriented monolayer provided in step (a) has an elastic modulus of 400 to 1,200 cN/dTex. According to yet another embodiment, the first unidirectionally oriented monolayer provided in step (a) has an elongation modulus of 2-6%.

According to yet another embodiment, each one of the unidirectional ultrahigh-molecular-weight polyethylene strip provided in step (b) of the method of this aspect has a tensile strength within the range of 8 to 40 cN/dTex. According to yet another embodiment, each one of the unidirectional ultrahigh-molecular-weight polyethylene strip provided in step (b) is about 30-120 μm thick. According to yet another embodiment, each one of the unidirectional ultrahigh-molecular-weight polyethylene strip provided in step (b) has an areal density of 60-200 g/m$^2$. According to yet another embodiment, each one of the unidirectional ultrahigh-molecular-weight polyethylene strip provided in step (b) has an elastic modulus of 400 to 1,200 cN/dTex. According to yet another embodiment, each one of the unidirectional ultrahigh-molecular-weight polyethylene strip provided in step (b) has an elongation modulus of 2-6%.

Yet another preferred method relates to the preparation of an ballistic resistant article, which comprises:
(a) aligning a plurality of unidirectional ultrahigh-molecular-weight polyethylene strips such that each strip is oriented in parallel to adjacent strips, wherein adjacent strips partially overlap, said plurality of strips being laid over a first unidirectional ultrahigh-molecular-weight polyethylene monolayer, with the direction of said plurality of strips being rotated with respect to the direction of said first unidirectional ultrahigh-molecular-weight polyethylene monolayer at an angle; and
(b) compressing said plurality of unidirectional ultrahigh-molecular-weight polyethylene strips laid over said unidirectional ultrahigh-molecular-weight polyethylene monolayer, thereby obtaining a bilayered material consisting essentially of ultrahigh-molecular-weight polyethylene and essentially devoid of bonding matrices, comprising two compressed unidirectional monolayers with the direction of each monolayer being rotated at an angle with respect to the direction in an adjacent unidirectional monolayer, with the bilayered material being essentially devoid of resins or adhesives.

If desired, the method can include the additional step of associating the bilayered material with an additional material selected from the group consisting of: ceramic, steel, aluminum, titanium, glass and graphite to form a further ballistic resistant material.

Polyethylene Strips and Monolayers Comprising Same

A unidirectional polyethylene monolayer according to the present invention is composed of at least two high-strength unidirectional polyethylene strips. The strips partially overlap. In various embodiment, the overlapping area is covered with a thin strip of low density polyethylene prior to the compression and thereby formation of the unidirectional monolayer.

The terms "unidirectional films" or "unidirectional strips" are interchangeably used herein to describe polyethylene films formed by compression-molding and unidirectional stretching of polyethylene. The direction of stretching determines the direction of the resulting films. The unidirectional films can be split along the direction of stretching.

Homopolymers of polyethylene are particularly suitable for preparing the unidirectional strips. The high-molecular weight polyethylene may be linear or branched. High molecular weight here means a molecular weight of at least 400,000 g/mol.

The term "linear polyethylene" as used herein refers to polyethylene having fewer than 1 side chain per 100 carbon atoms, preferably fewer than 1 side chain per 300 carbon atoms. The polyethylene may also contain up to 5 mol % of one or more other alkenes which are copolymerisable therewith, such as propylene, butene, pentene, 4-methylpentene, octene.

UHMW polyethylene films may be obtained using methods known in the art, for example, U.S. Pat. Nos. 4,879,076; 5,091,133; 5,106,555; 5,106,558 and 5,200,129 among others.

According to one embodiment, a UHMW polyethylene film is prepared by drawing particulate UHMW polyethylene powder at a temperature lower than the melting point thereof thereby obtaining a unidirectionally oriented UHMW polyethylene film exhibiting high tensile strength at the direction of stretching.

Drawing comprises the steps of: compression-molding, rolling and stretching. According to one embodiment, the polyethylene films are prepared as follow:
1. feeding a polyethylene in a powder form between a combination of endless belts disposed in an up-and-down opposing relation;
2. compression-molding the polyethylene powder at a temperature lower than the melting point of the polyethylene powder by pressing means; and
3. rolling the resultant compression-molded polyethylene, followed by stretching at a single direction, thereby obtaining a unidirectional polyethylene film.

At the first step, of feeding, the polyethylene powder must be distributed evenly between the belts. Uneven distribution may lead to the formation of a film having a non-homogeneous thickness that cannot be properly stretched.

Pressing means may be employed by holding the polyethylene powder between the endless belts and conveying the same, said pressing means comprising pressing platens and corresponding sets of rollers, all accommodated within the respective endless belts, the rollers in each set being connected together, and said sets of rollers being arranged movably in an endless fashion between the respective platens and the endless belts associated therewith.

Stretching commonly comprises extrusion stretching and tensile stretching commonly employed in the art. To attain great mechanical strength and high elastic modulus, two-stage drawing is preferred in which particulate polyethylene is first extrusion-stretched, followed by tensile stretching of the extrudate.

Compression can preferably be conducted prior to solid phase extrusion or rolling. There is no particular restriction imposed on the method of compressing particulate polyethylene. In the case of solid phase extrusion, the polymer may be compressed in the above extruder into a rod-like shape at a temperature below its melting point and in a wide range of pressures. Particulate polyethylene and a different type of polymer may be pressed together into a monolayer of 30-120 μm thickness at a temperature below their respective melting points and at a similar pressure. In the ease of rolling, particulate polyethylene may be compressed by a suitable known method into a film or monolayer in which instance pressing is preferred as in co-extrusion.

According to one embodiment, the tensile strength of a 2 mm split cut from an ultrahigh molecular weight polyethylene strip of the invention is 8 to 40 cN/dtex. All tensile properties are evaluated by methods known in the art, for example, by pulling a 10 in. (25.4 cm) split length clamped in barrel clamps at a rate of 10 inch/min (25.4 cm/min) on an Instron Tensile Tester.

The polyethylene strip according to the present invention is typically 5 to 25 cm wide. Broader or narrower polyethylene films are similarly useful for the preparation of the ballistic resistant article of the present invention. The areal density of the polyethylene strip 60-200 g/m$^2$. The elongation modulus of the polyethylene strip is within the range of 2-6%. According to an alternative embodiment, the maximal displacement of the polyethylene strip is 2-12 mm/200 mm.

Polyethylene Materials

The polyethylene monolayers of the present invention comprise a plurality of a high-strength unidirectional polyethylene strips, the unidirectional strips are oriented in parallel in one plane, next to one another. According to some embodiments, the strips partially overlap, the overlapping area is between 5 μm to 40 mm wide. According to an alternative embodiment, the strips contact each other but do not substantially overlap, wherein a narrow polymeric film, about 5 to 20 μm wide, is laid over the axis of contact between two adjacent strips. The parallel strips, either overlapping or substantially not overlapping, are then compressed under a temperature below the melting temperature of the polyethylene, preferably at 110 to 150° C. and under a pressure of 10 to 100 N/cm$^2$. The resulting polyethylene monolayer is unidirectional wherein the direction of the monolayer is essentially the direction of the strips therein.

The areal density of the polyethylene material consisting of a bilayer of two ultrahigh molecular weight polyethylene monolayers is 100-500 g/m$^2$.

Ballistic Resistant Polyethylene Article

The present invention further related to ballistic resistant molded articles comprising unidirectional high-strength monolayers stacked cross-wise, the monolayers consisting essentially of ultrahigh molecular weight polyethylene and essentially devoid of resins and other bonding materials, wherein the stack is compressed at a given pressure and temperature for a given time.

According to one embodiment, the present invention provides a ballistic resistant polyethylene article comprising 70 to 280 polyethylene monolayers compressed at an angle to one another.

The National Institute of Justice (NIJ) rates body armor on ballistic protection levels. As layers of a ballistic fiber (e.g. DuPont KEVLAR®) or ballistic films being added, protection is enhanced. Vests are tested not just for stopping penetration, but also for blunt trauma protection, namely the blow experienced by the body as a result of ballistic impact on the vest. Blunt trauma is measured by the dent suffered by a soft clay backstop to the vest, wherein a maximum of 1.7" (44 mm) is allowed.

A bulletproof jacket comprising a multilayered article of the present invention, the multilayered article consisting of 200 to 300 monolayers and having an areal density of approximately 17 kg/m$^2$, provides a level III standard NIJ protection.

The ballistic resistant polyethylene article is also resistant to stabbing with knives or other sharp elements. For this purpose resistance may be achieved by using an article comprising a few monolayers.

According to various embodiments, the ballistic resistant polyethylene article is provided in combination with an additional material selected from the group consisting of: ceramic, steel, aluminum, titanium, glass and graphite. The ballistic resistant polyethylene article and the additional material may be bonded or otherwise retained by support means such as fiberglass, fabric, polymeric plastics and elastomers and the like.

Additionally, due to the exceptionally high heat resistance of the article of the invention, the article may be suitable as covering for running engines, for example, combustion engines.

The overall thickness requirements and weight of the ballistic resistant articles of the present invention are greatly reduced as compared to similar ballistic resistant articles of the prior art.

The UHMW polyethylene article of the present invention may have any desired dimension, depending upon the particular application thereof. The article may be flat or contoured and may have relatively large surface area. For example, the article size may be such that it is suitable for covering the entire thorax region of a wearer.

Methods for Preparing Polyethylene Monolayers, Materials and Ballistic Resistant Articles The present invention provides methods for preparing a unidirectional monolayer consisting essentially of ultrahigh molecular weight polyethylene and essentially devoid of resins and any other bonding matrices. The present invention further provides method for preparing rigid and impenetrable materials from unidirectional high-strength polyethylene monolayers and method for preparing ballistic resistant multilayered articles from said polyethylene monolayers.

According to yet another aspect, the present invention provides a method for the continuous preparation of a unidirectional monolayer consisting essentially of ultrahigh-molecular-weight polyethylene, comprising:
(a) providing a plurality of unidirectional ultrahigh-molecular-weight polyethylene strips;
(b) aligning the plurality of unidirectional ultrahigh-molecular-weight polyethylene strips in the same direction, wherein adjacent strips partially overlap; and
(c) compressing said plurality of unidirectional ultrahigh-molecular-weight polyethylene strips thereby obtaining a unidirectional ultrahigh-molecular-weight polyethylene monolayer.

According to one embodiment, compressing said plurality of unidirectional ultrahigh-molecular-weight polyethylene strips occurs at a temperature below the melting point of the ultrahigh-molecular-weight polyethylene. Typically, compressing said plurality of unidirectional ultrahigh-molecular-weight polyethylene strips occurs at a temperature between 10 to 150° C. and a pressure of 10 to 100 N/cm².

According to a particularly preferred embodiment, the unidirectional ultrahigh-molecular-weight polyethylene monolayer essentially devoid of bonding matrices.

According to yet another embodiment, the unidirectional ultrahigh-molecular-weight polyethylene monolayer has a tensile strength within the range of 8-40 cN/dTex. According to yet another embodiment, the unidirectional ultrahigh-molecular-weight polyethylene monolayer has an elastic modulus of 400 to 1,200 cN/dTex. According to yet another embodiment, the unidirectional ultrahigh-molecular-weight polyethylene monolayer has a maximal displacement of 2-12 mm per 200 mm. According to yet another embodiment, the unidirectional ultrahigh-molecular-weight polyethylene monolayer has an elongation modulus within the range of 2-6%.

According to an alternative embodiment, the method comprising after step (b) and before step (c) the step of: laying a strip of polymeric film over each area of contact between two adjacent unidirectional ultrahigh-molecular-weight polyethylene strips, the strip of polymeric film is laid in parallel to the direction of the aligned plurality of unidirectional ultrahigh-molecular-weight polyethylene strips.

According to one embodiment, the strip of polymeric film is 4 to 25 µm thick. The polymeric film may be selected from the group consisting of: low density polyethylene, high density polyethylene, polyamide, polypropylene, polyester, polystyrene, polyethylene, polycarbonate and poly(methyl methacrylate).

According to yet another aspect, the present invention provides a method for the continuous preparation of a material comprising a plurality of compressed unidirectional monolayers consisting essentially of ultrahigh-molecular-weight polyethylene and essentially devoid of bonding matrices, with the direction of each monolayer being rotated with respect to the direction in an adjacent unidirectional monolayer, the method comprising:
(a) providing a first unidirectional ultrahigh-molecular-weight polyethylene monolayer;
(b) providing a plurality of unidirectional ultrahigh-molecular-weight polyethylene strips;
(c) laying the plurality of unidirectional ultrahigh-molecular-weight polyethylene strips over the first unidirectional ultrahigh-molecular-weight polyethylene monolayer, such that said plurality of strips are aligned in the same direction wherein adjacent strips partially overlap, wherein the direction of said plurality of strips being rotated with respect to the direction of said first unidirectional ultrahigh-molecular-weight polyethylene monolayer at an angle; and
(d) compressing said plurality of unidirectional ultrahigh-molecular-weight polyethylene strips laid over said unidirectional ultrahigh-molecular-weight polyethylene monolayer, thereby obtaining a bilayered material consisting essentially of ultrahigh-molecular-weight polyethylene and essentially devoid of bonding matrices, comprising two compressed unidirectional monolayers with the direction of each monolayer being rotated with respect to the direction in an adjacent unidirectional monolayer at an angle.

According to certain embodiments, the plurality of strips are rotated at an between 20 to 160 degrees with respect to the direction of said first unidirectional ultrahigh-molecular-weight polyethylene monolayer. According to other embodiments, the angle is of 70 to 110 degrees. According to yet other embodiments, the angle is of substantially 90 degrees.

According to an alternative embodiment, the method further comprises after step (c) and before step (d) the step of laying a strip of polymeric film over each area of contact between two adjacent unidirectional ultrahigh-molecular-weight polyethylene strips, the strip of polymeric film is laid in parallel to the direction of the aligned plurality of unidirectional ultrahigh-molecular-weight polyethylene strips.

According to one embodiment, the strip of polymeric film is 4 to 25 µm thick. According to another embodiment, the polymeric film is selected from the group consisting of: low density polyethylene, high density polyethylene, polyamide, polypropylene, polyester, polystyrene, polyethylene, polycarbonate and poly(methyl methacrylate).

According to another embodiment, step (d) occurs at a temperature below the melting point of the ultrahigh-molecular-weight polyethylene, commonly between 100 to 150° C. and under a pressure of 10 to 100 N/cm².

According to one embodiment, the bilayered material obtained by the method of this aspect has a tensile strength within the range of 8 to 40 cN/dTex at any direction. According to yet another embodiment, the bilayered material is about 60-500 μm thick. According to yet another embodiment, the bilayered material has an areal density of 100-500 g/m². According to yet another embodiment, the bilayered material has an elastic modulus of 400 to 1,200 cN/dTex. According to yet another embodiment, the bilayered material has an elongation modulus of 2-6%.

Since the bilayered material comprises two unidirectional monolayers compressed at an angle to one another, its strength is no longer dependent on the direction of each monolayer encompassed therein. Rather, the foregoing parameters can be obtained from measuring the tensile strength, elastic modulus and elongation modulus of the bilayered material at any direction. The extent of these parameter is not necessarily limited to a particular direction of the bilayered material.

According to another embodiment, the method further comprises;
(e) repeating steps (a) to (d) at least once, thereby obtaining a plurality of bilayers; and
(f) compression-molding the plurality of bilayers obtained in step (c) thereby obtaining a multilayered material.

According to an alternative embodiment, step (e) is repeated until the desired number of bilayered materials is obtained.

Compression-molding is intended to mean that the stack of materials is subjected to a given pressure for a particular compression time at a compression temperature below the softening or melting point of the ultrahigh molecular weight polyethylene. The required compression time and compression temperature depend on the kind of polyethylene and on the thickness of the stack and can be readily determined by one skilled in the art.

In the process of the invention the stack may be made starting from loose unidirectional monolayers. However, loose monolayers are difficult to handle in that they easily tear in the direction of stretching. It is therefore preferred to make the multilayered stack from consolidated monolayer materials containing from 2 to 8, preferably 2, monolayers that are compressed cross-wise. Consolidated is intended to mean that the monolayers are firmly attached to one another. The resulting materials are then stacked and compressed to obtain a multilayered material.

According to one embodiment, step (f) is conducted at a temperature between 90 and 150° C. and under a pressure of 100 to 160 bar.

It has been found that in order for a high ballistic resistance to be attained it is necessary that after compression at a high temperature cooling, too, take place under pressure. Cooling under pressure is intended to mean that the given minimum pressure is maintained during cooling at least until so low a temperature is reached that the structure of the multi layered article can no longer relax under atmospheric pressure so that the ballistic resistance value cannot decrease. This temperature can be established by one skilled in the art. It is preferred for cooling at the given minimum pressure to be down to a temperature below the relaxation temperature of the polyethylene monolayers of materials. The pressure during the cooling does not need to be equal to the pressure at the high temperature, but it is preferred that these pressures are equal.

The pressure loss resulting from shrinkage of the molded multilayered article and the press due to cooling must regularly be compensated for so as to keep the pressure during cooling constant or at least on a sufficient high level.

For the manufacture of a ballistic-resistant molded article in which each monolayer consists essentially of high-molecular-weight polyethylene, the compression temperature is 90 to 150° C., preferably 115 to 130° C. and, optionally, cooling to below 70° C. is effected at a constant pressure. Compression temperature here means the temperature at half the thickness of the molded article. The compression pressure is 100 to 180 bar, preferably 120 to 160 bar and the compression time is between 40 to 180 minutes.

The following examples are to be construed in a non-limitative fashion and are intended merely to be illustrative of the principles of the invention disclosed.

EXAMPLES

Example 1

Solid Ultrahigh Polyethylene

Various ultrahigh molecular weight polyethylene solid products can be used to form the strips and monolayers of the invention. For example, MIPELON™ (Mitsui Chemicals America, Inc.), HI-ZEX® MILLION (Mitsui Chemicals America, Inc.) and PE type 1900CM (Basell USA Inc.), among others. The solid product is preferably a fine powder of ultra-high molecular weight polyethylene, with a molecular weight of about $2 \cdot 10^5$ to $6 \cdot 10^6$ microns or more and particle measurements of no more than 25 to 200 microns.

Example 2

Preparation of a Polyethylene Film

A unidirectional polyethylene film was prepared from a fine powder of UHMW polyethylene having the following properties: an average molecular weight range between 4 and 5 million, intrinsic viscosity—26 dl/g, density (molded part)—0.93 g/cm³, tensile stress at yield—2,700 psi (19 Mpa), tensile elongation at yield—6%, tensile stress at break 6,000 psi (40 Mpa), tensile elongation at break 340% and bulk density—0.43-0.47 g/cm³.

Rolling and Tensile Stretching: The polymer was pressed at 125° C. and at 0.02 GPa into a 0.2 mm thick film which was then passed at 130° C. through a pair of counter-rotating rollers each dimensioned to be 100 mm in diameter and 500 mm in crosswise length and having different peripheral speeds, thereby forming a film drawn at a ratio of 6.

Stretch moldability of the resulting film was tested with a tensile tester and under conditions of temperature 120° C. and crosshead speed 40 mm/min. Molding was possible at a draw ratio of 20.

The UHMW polyethylene film (FIG. 1) showed a melting point (peak temperature) of 141° C. as measured without heat treatment by differential scanning calorimetry with temperature rise 5° C./min (DSC-20 calorimeter, manufactured by Seiko Denshi Kogyo K. K.).

Example 3

Preparation of an UHMW Polyethylene Monolayer

Figure 2:
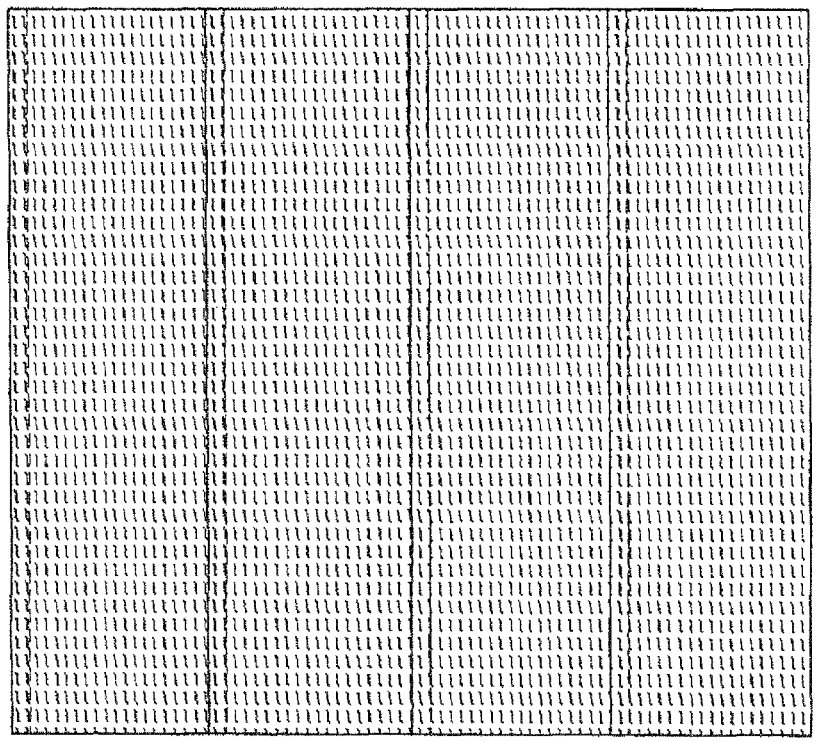
FIG. 2 presents a polyethylene monolayer comprising four overlapping polyethylene strips.

Unidirectional polyethylene strips (films), each strip is about 2-50 cm, typically 8 cm wide, are aligned next to one another in parallel, the direction of alignment is parallel to the direction of the strips (namely, the direction of stretching) whereas the strips partially overlap, the overlapping area is about 5 mm wide (6% of the width of each strip overlaps with 6% of the width of an adjacent strip). The overlapping strips are laminated at 140° C. under a pressure of 20 N/cm². No resins or matrices are added. The density of the resulting monolayer (FIG. 2) is ca. 62.5 g/m² and the thickness is about 6.7 µm.

Example 4

Preparation of an UHMW Polyethylene Article

Figure 3:
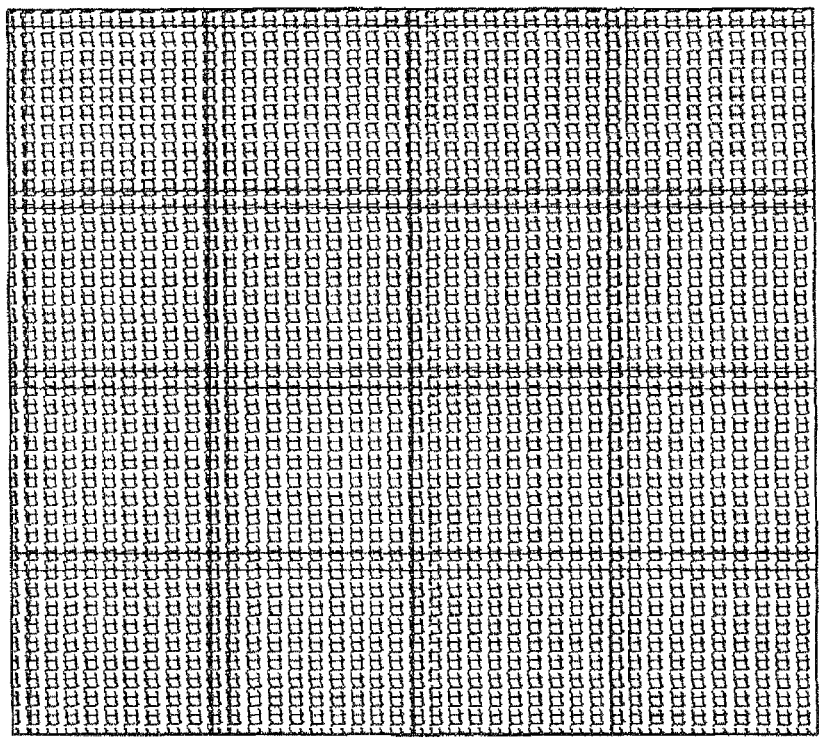
FIG. 3 exhibits a plurality of polyethylene strips laid at an angle of substantially 90 degrees over a unidirectional UHMW polyethylene monolayer.

Approximately 25 strips of a unidirectional polyethylene film are placed over a unidirectional polyethylene monolayer. Each strip is about 8 cm wide. The strips are aligned at the direction of stretching next to one another in parallel and in an angle of about 90 degrees to the direction of the monolayer (FIG. 3). The strips and the monolayer are compressed at 140° C. under a pressure of 20 N/cm². No resins or elastomeric matrices are added. As a result a two-plies UHMW polyethylene material comprising two UHMW polyethylene monolayers devoid of resins and other bonding matrices is obtained.

Figure 4:
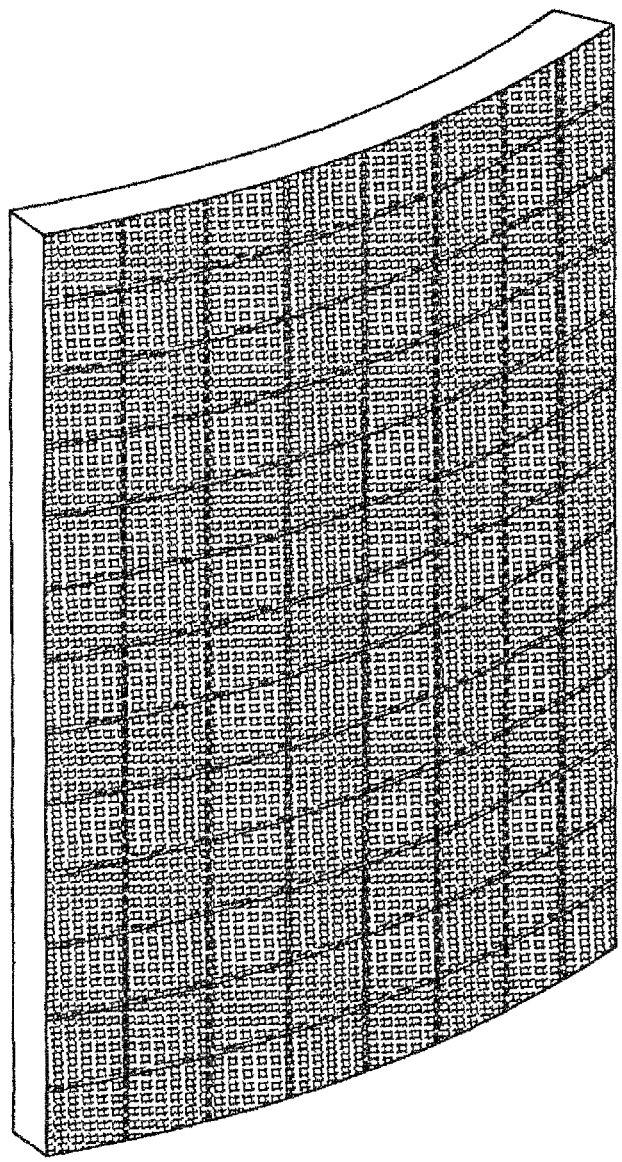
FIG. 4 demonstrates a polyethylene article comprising a plurality of polyethylene monolayers cross-plied at an angle of substantially 90 degrees to one another and compressed at about 120° C. under a pressure of about 140 bar.

The process is repeated until a desired number of two-plied UHMW polyethylene materials is obtained. The two-plied UHMW polyethylene materials are laid one on top of the other to form a stack. The stack is cut to a desired shape and then pressed at a temperature of about 120° C. and under a pressure of 140 bar for about one hour. The resulting article is present in FIG. 4.

Example 5

Ballistic Resistance of an UHMW Polyethylene Article

The antiballistic properties of the article of the invention were tested using a multilayered article consisting essentially of ultrahigh molecular weight polyethylene manufactured according to the methods of the invention. The tested multilayered article had an areal density of 20.85 kg/m² and a size of 250×300 mm², A backing comprising 30 layers of aramid fibers (Twaron™, Akzo Nobel) was laid on the multilayered article, without any bonding materials. The backing and the multilayered article were positioned in a fabric pocket together with a 102 mm clay backing.

The ballistic test was carried out with a Barrel gun, 24 inch barrel length and a caliber of 7.620 mm, bullet type M-80 and bullet weight of 148 grain. Angle of shot was 0 degrees. The results of the ballistic test are summarized in Table 1.

TABLE 1

| Shot No. | TRAUMA depth/width (mm) | | VELOCITY | | PENETRATE (Y/N) |
| --- | --- | --- | --- | --- | --- |
| | | | m/sec | ft/sec | |
| 1 | 37 | 0 | 855 | 2805 | N |
| 2 | 38 | 0 | 856 | 2810 | N |
| 3 | 0 | 0 | 852 | 2796 | N |
| 4 | 0 | 0 | 849 | 2784 | N |
| 5 | 0 | 0 | 854 | 2801 | N |
| 6 | 0 | 0 | 852 | 2796 | N |
| average of not penetrating shots | 12.5 | 0.0 | 853 | 2798 | |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

The invention claimed is:

1. A method for preparing a ballistic resistant article, which comprises:
    (a) aligning a plurality of unidirectional ultrahigh-molecular-weight polyethylene flat film strips such that each strip is oriented in parallel to adjacent strips such that adjacent strips contact each other but do not overlap along an edge region thereof, said plurality of strips being laid over a first unidirectional ultrahigh-molecular-weight polyethylene monolayer, with the direction of said plurality of strips being rotated with respect to the direction of said first unidirectional ultrahigh-molecular-weight polyethylene monolayer at an angle; and
    (b) compressing said plurality of unidirectional ultrahigh-molecular-weight polyethylene flat film strips laid over said unidirectional ultrahigh-molecular-weight polyethylene monolayer, thereby obtaining a bilayered material consisting essentially of ultrahigh-molecular-weight polyethylene and essentially devoid of bonding matrices, comprising two compressed unidirectional monolayers with the direction of each monolayer being rotated at an angle with respect to the direction in an adjacent unidirectional monolayer, with the bilayered material being essentially devoid of resins or adhesives.

2. The method of claim 1, which further comprises associating the bilayered material with an additional material selected from the group consisting of ceramic, steel, aluminum, titanium, glass and graphite.

3. A method for the preparation of a bilayered material comprising a plurality of unidirectional monolayers consisting essentially of ultrahigh-molecular-weight polyethylene and essentially devoid of bonding matrices, with the direction of each monolayer being rotated with respect to the direction in an adjacent unidirectional monolayer, the method comprising:
    (a) providing a first unidirectional ultrahigh-molecular-weight polyethylene monolayer;
    (b) providing a plurality of unidirectional ultrahigh-molecular-weight polyethylene flat film strips;
    (c) aligning the plurality of unidirectional ultrahigh-molecular-weight-polyethylene flat film strips such that each strip is oriented in parallel to adjacent strips such that adjacent strips contact each other but do not overlap along an edge region thereof, said plurality of strips being laid over the first unidirectional ultrahigh-molecular-weight polyethylene monolayer, with the direction of said plurality of strips being rotated with respect to the direction of said first unidirectional ultrahigh-molecular-weight-polyethylene monolayer at an angle; and
    (d) compressing said plurality of unidirectional ultrahigh-molecular-weight-polyethylene flat film strips laid over said unidirectional ultrahigh molecular-weight polyethylene monolayer, thereby obtaining a bilayered material consisting essentially of ultrahigh-molecular-weightpolyethylene and essentially devoid of bonding matrices, comprising two compressed unidirectional monolayers with the direction of each monolayer being rotated at an angle with respect to the direction in an adjacent unidirectional monolayer.

4. The method of claim 3, further comprising:
(e) repeating steps (a) to (d), at least once thereby obtaining a plurality of bilayered materials; and
(f) compressing-molding at least two bilayered materials obtained in step (e) thereby obtaining a multilayered material, with step (e) repeated until the desired number of bilayered materials is obtained.

5. The method of claim 3, further comprising the step of cutting the multilayered material to a desired shape.

* * * * *